United States Patent [19]
Sensyu

[11] Patent Number: 6,125,100
[45] Date of Patent: Sep. 26, 2000

[54] OPTICAL DISC HAVING DATA RECORDED IN AN ENCODED BLOCK FORM FOR IMPROVING ERROR CORRECTION CAPABILITY AND AN APPARATUS UTILIZING SUCH OPTICAL DISC

[75] Inventor: Susumu Sensyu, Kanagawa, Japan

[73] Assignee: Sony Corporation, Tokyo, Japan

[21] Appl. No.: 09/157,164

[22] Filed: Sep. 18, 1998

[30] Foreign Application Priority Data

Sep. 22, 1997 [JP] Japan ..................................... 9-257217

[51] Int. Cl.$^7$ ....................................................... G11B 7/24
[52] U.S. Cl. ....................................................... 369/275.3
[58] Field of Search ................................. 369/275.3, 59, 369/58, 275.2, 32, 54, 275.4, 44.26

[56] References Cited

U.S. PATENT DOCUMENTS

| | | | |
|---|---|---|---|
| 4,599,717 | 7/1986 | Bracht et al. | 369/54 |
| 4,734,901 | 3/1988 | Murakami | 369/59 |
| 5,684,893 | 11/1997 | Shikakura | 382/232 |
| 5,721,720 | 2/1998 | Kikuchi et al. | 369/275.3 |
| 5,796,438 | 8/1998 | Hosono | 348/458 |
| 5,896,355 | 4/1999 | Sako et al. | 369/58 |

OTHER PUBLICATIONS

Patent Abstracts of Japan, vol. 17, no. 519 (P–1615), Sep. 17, 1993, JP 05 135503 Jun. 1, 1993.
K. A. Schouhamer Immink: "The Digital Versatile Disc (DVD): System Requirements and Channel Coding" SMPTE JOURNAL, Aug. 1996 (1996–08), pp. 483–489, XP000627183.

*Primary Examiner*—Tan Dinh
*Attorney, Agent, or Firm*—Frommer Lawrence & Haug, LLP.; William S. Frommer; Dennis M. Smid

[57] ABSTRACT

An optical disc and an optical disc apparatus having an improved error correction capability. In an optical disc on which is recorded data encoded using an encoding block of a pre-set data volume as a unit for encoding, a data volume V of the encoding block is the maximum number among data volume values of the encoding block that satisfies the relation $VX(1+R)XD<L0$, and that can be expressed by the powers of 2, where L0 is the innermost track length, R is the redundancy of encoding, and D is the code length per bit. In this manner, the encoding block is of a size corresponding or substantially corresponding to the entire innermost track of an optical disc.

12 Claims, 9 Drawing Sheets

FIG.5A
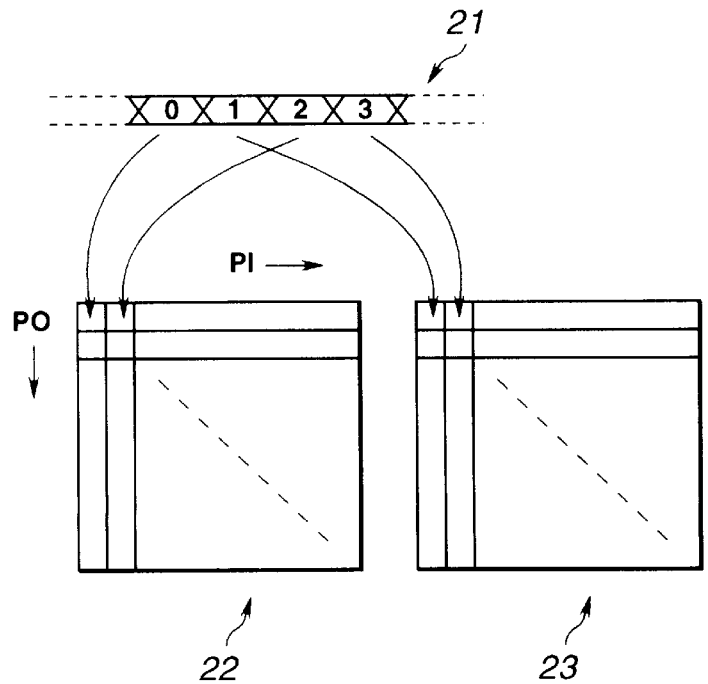
FIG.5B
FIG.6A
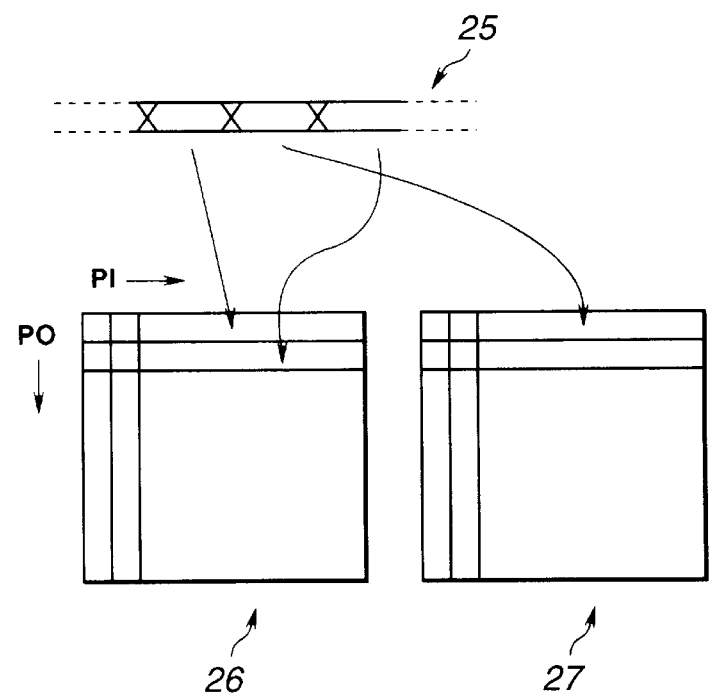
FIG.6B

OPTICAL DISC HAVING DATA RECORDED IN AN ENCODED BLOCK FORM FOR IMPROVING ERROR CORRECTION CAPABILITY AND AN APPARATUS UTILIZING SUCH OPTICAL DISC

BACKGROUND OF THE INVENTION

1. Field of the Invention

This invention relates to an optical disc for recording/reproducing data, in terms of an encoding block as a unit, and an optical disc device employing this optical disc.

2. Description of the Related Art

In an optical recording medium, such as a read-only optical disc, a write-once optical disc or an overwrite optical disc, there is occasionally produced an error in reproduced data due to disc defects or contaminants deposited on its recording surface.

Such disc defect or the data error caused by dust and dirt render unstable the servo operation of controlling the disc rotation. This data error is liable in turn to cause further data errors. In order to combat this inconvenience, it is customary with the optical disc to append parity bits for error correction to recording data.

In a data structure disclosed in Japanese Laying-Open Patent H-8-346108, a two-dimensional array of 172 words by 192 rows represents an ECC block, as shown in FIG. 1. That is, in the C1 direction in the drawing, referred to hereinafter as the PI direction, 10-word parity bits to 170 words are appended to the data, so that 172 words of data and 10 words of PI parity make up a column. 192 such columns are arrayed and 16-word parity bits (PO parity) are appended in the C2 direction, referred to hereinafter as the PO direction.

These PI and PO parities are parity bits for error correction by the Reed Solomon product Code (RPSC).

This ECC block is split in recording units termed sectors. A number of the ECC blocks are recorded on the sector basis on a track of the optical disc. This sector is obtained by dividing the ECC block of 32 KB data into 16 equal portions such that each divided portion represents a data unit of 2 KB.

In this ECC block, each sector is made up of 13 columns, each ECC block being made up of 16 sectors, as shown in FIG. 2. This sector is made up of 12 columns of the data area of the ECC block and a column of the PO parity.

Recently, a demand is raised for an optical disc of a higher density and a larger capacity than the digital video disc in order to enable recording of a larger volume of data.

It is assumed that, in a high-density optical disc having the recording density of the optical disc of the digital video disc standard doubled in the track direction, the disc defect and the dust size are the same as those of the above-mentioned digital video disc. In this case, the correction capability of, for example, not less than 5 mm in terms of the length of the track is required for error correction. Thus, the correction capability of a data volume larger by an amount corresponding to improved recording density than with the conventional optical disc is required.

If, in an optical disc having increased recording density for coping with high recording density, an equivalent code to that of a digital video disc is used with an equivalent redundancy, an equivalent error correction is achieved. However, it is not possible to provide a correction capability of not less than 5 mm in terms of the track length.

In view of considerable difficulties in increasing the recording density, it is not desirable to increase the redundancy due to the logical format. Moreover, it is desirable to improve the correction capability for correcting the errors due to dust or scratches on the substrate especially if a thin substrate of the optical disc is used.

SUMMARY OF THE INVENTION

It is therefore an object of the present invention to provide an optical disc having an improved error correction capability without increasing redundancy in error correction capability, and an optical disc apparatus for recording and/or reproducing the optical disc with an improved error correction capability.

In one aspect, the present invention provides an optical disc on which is recorded data encoded with an encoding block of a pre-set data volume as a unit for encoding, wherein a data volume V of the encoding block is the maximum number among data volume values of the encoding block that satisfies the relation VX(1+R) XD<L0, and that can be expressed by the powers of 2, where L0 is the innermost track length, R is the redundancy of encoding, and D is the code length per bit.

In another aspect, the present invention provides an optical disc apparatus for recording and/or reproducing information signals on or from an optical disc, wherein an optical disc is used on which is recorded data encoded with an encoding block of a pre-set data volume as a unit for encoding, and wherein a data volume V of the encoding block is the maximum number among data volume values of the encoding block that satisfies the relation VX(1+R) XD<L0, and that can be expressed by the powers of 2, where L0 is the innermost track length, R is the redundancy of encoding, and D is the code length per bit.

By increasing the ECC block size to a size corresponding or substantially corresponding to an entire track, in an optical disc of high recording density and large recording capacity, it is possible to increase the error correction capability.

By encoding/decoding data so that the ECC block will be increased to the size of an entire track or to a size approximately equal to an entire track, in an optical disc apparatus adapted for recording and/6r reproducing data on or from a high-density large-capacity optical disc, it is similarly possible to improve the data correction capability.

BRIEF DESCRIPTION OF THE DRAWINGS

FIGS. 5A and 5B show the method of constructing an ECC block from a data flow.

FIGS. 6A and 6B similarly show the method of constructing an ECC block from a data flow.

DESCRIPTION OF THE PREFERRED EMBODIMENTS

Figure 1:
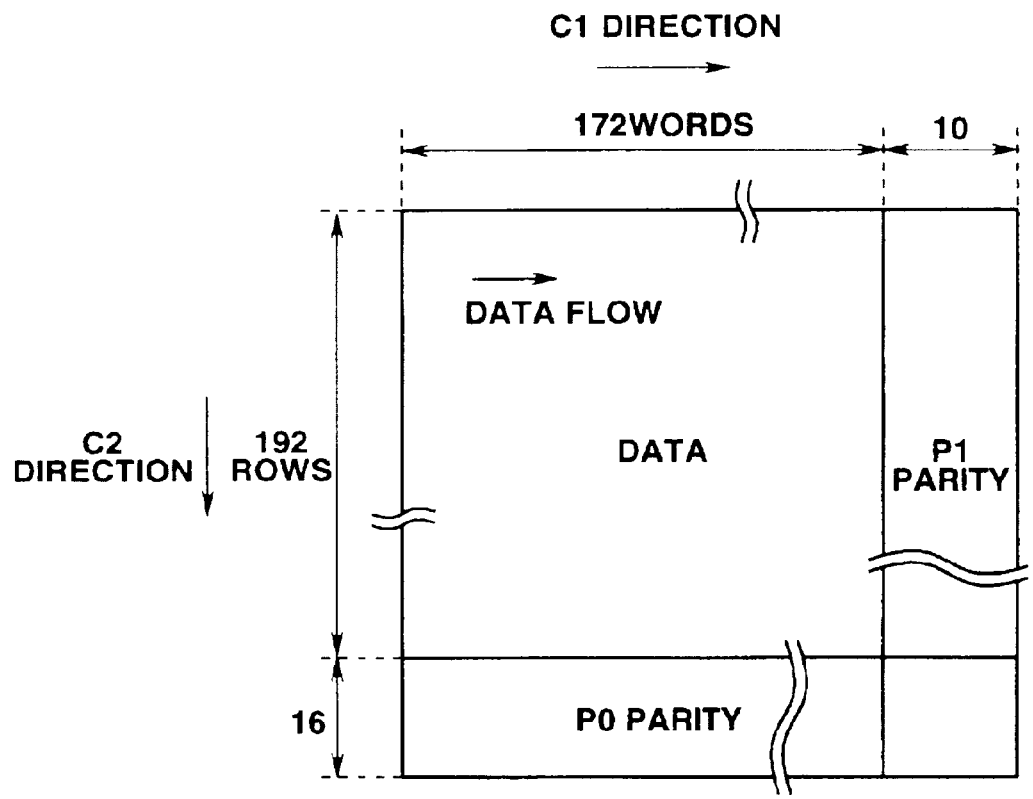
FIG. 1 shows a format of a conventional ECC block.
Figure 2:
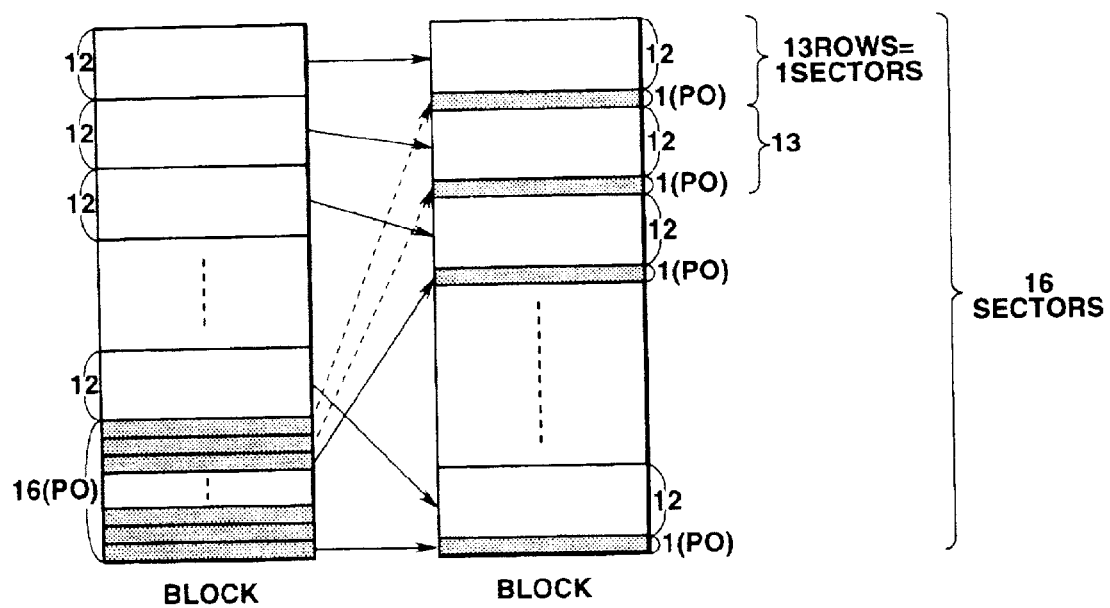
FIG. 2 shows a method for dividing the ECC sector into blocks.

Referring to the drawings, preferred embodiments an optical disc and an optical disc device of the present invention will be explained in detail.

Figure 3:
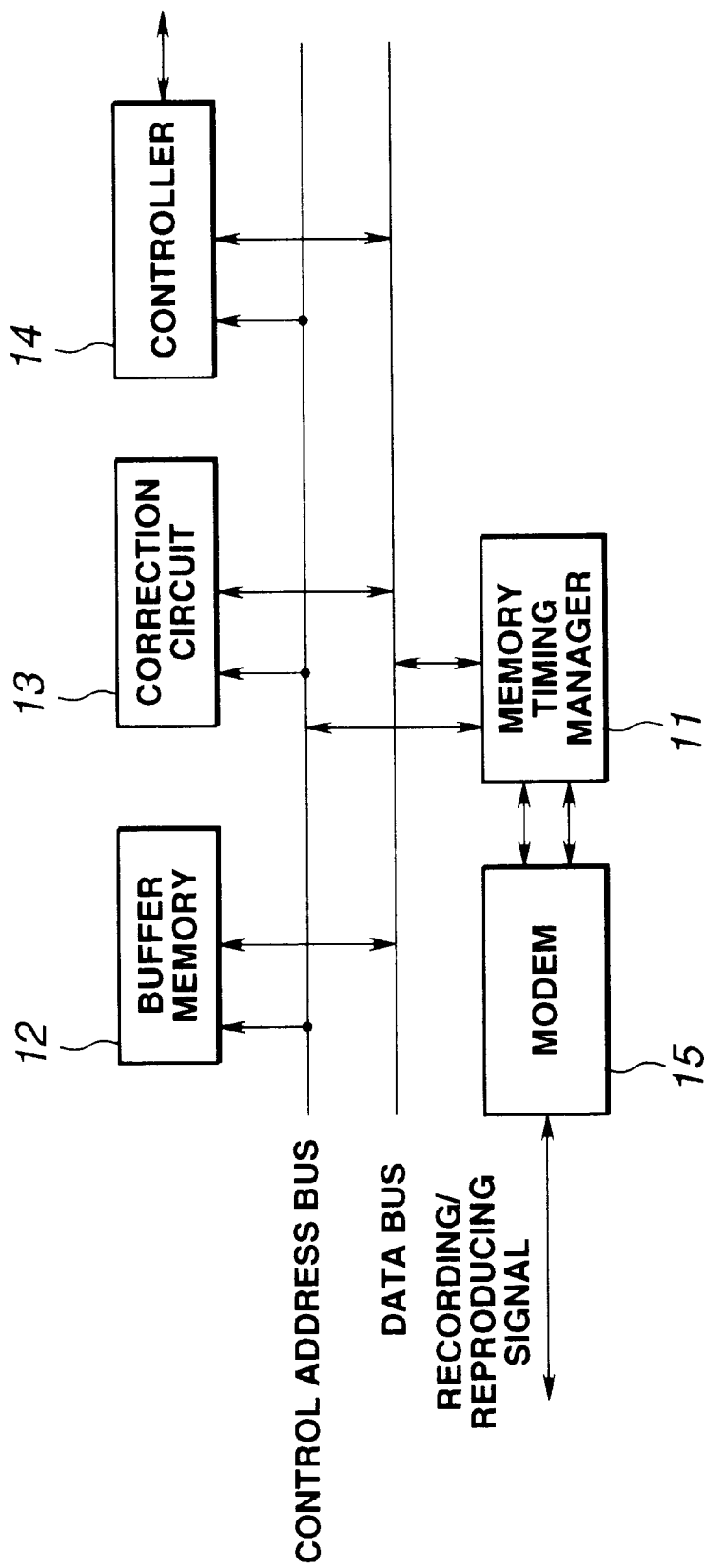
FIG. 3 is a schematic block diagram showing a structure of an optical disc apparatus.
Figure 4:
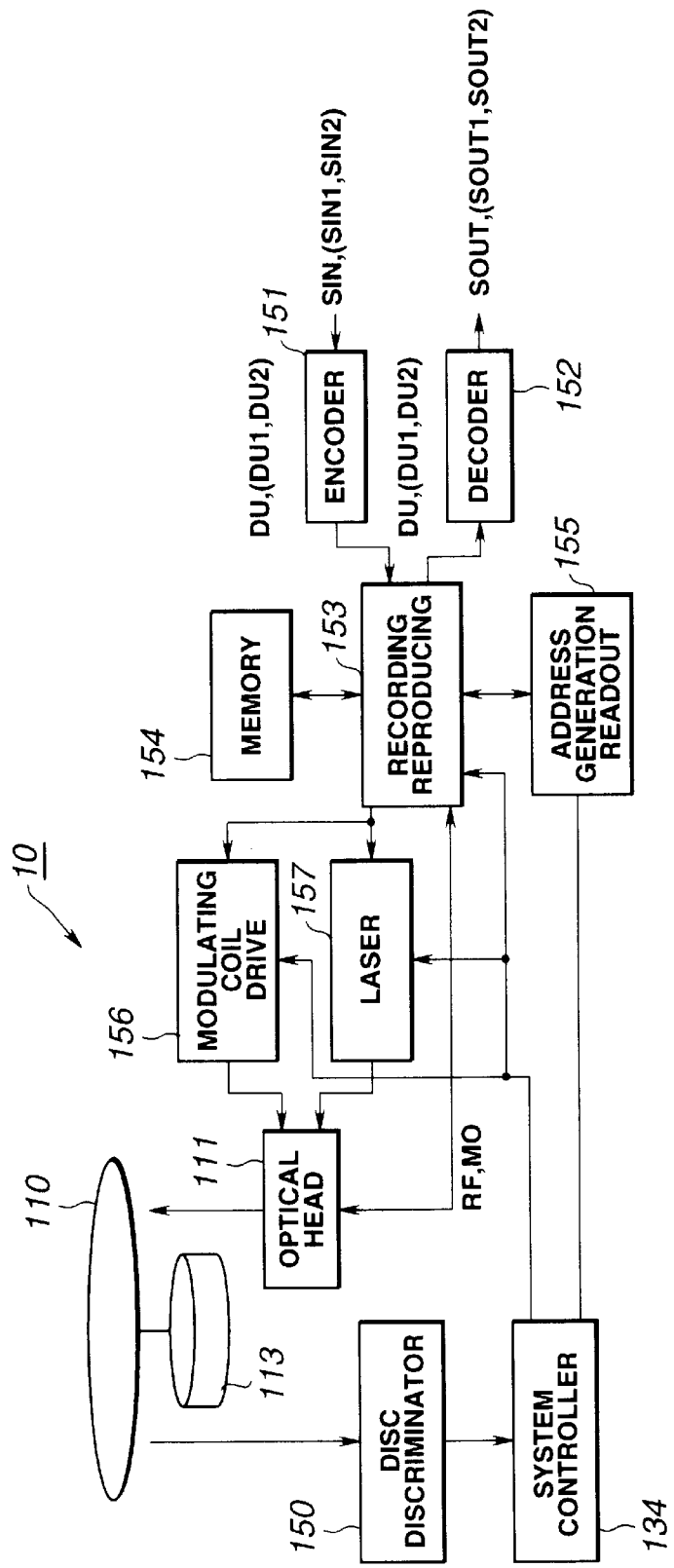
FIG. 4 is a block diagram showing a more detailed structure of the optical disc apparatus.

FIGS. 3 and 4 show essential portions and an entire structure of the optical disc device, respectively. The structure shown in FIG. 3 includes portions of an encoder 151 and a decoder 152 in FIG. 4, a recording/reproducing circuit 153 and a memory 154.

The essential portions of the optical disc device, shown in FIG. 3, include a modulation/demodulation circuit 15 for transmitting/receiving signals to or from an optical pickup for recording/reproducing signals on or from an optical disc, and a memory timing manager 11, in addition to a buffer memory 12, a correction circuit 13 and a controller 14 connected over a bus to the memory timing manager 11.

The present optical disc device records and/or reproduces data on or from an optical disc. The operation of various parts of the present optical disc device when the optical disc device reproduces data from the optical disc is first explained.

The controller 14 is fed with video data for recording on the optical disc from a video data output terminal of an external connection device having a picture compression unit and a video signal input. This external connection device is e.g., a video camera or a video tape reproducing device, and sends digital data to the controller 14.

The controller 14 sends to the buffer memory 12 digital data sent from an external connection device and the memory timing manager 11 via data request signals. The controller 14 controls the various portions of the optical disc device for recording data on an entire track of the optical disc or to an approximate data size.

If a sufficient amount of data to append parity bits is stored in the buffer memory 12, that is if one-block data is stored in the buffer memory 12, the memory timing manager 11 sends data from the buffer memory 12 to the correction circuit 13.

The correction circuit 13 finds parity bits from the one-block data supplied thereto. When the correction circuit 13 finds the parity bits, the memory timing manager 11 causes data with appended parity bits to be stored in the buffer memory 12.

The memory timing manager 11 interleaves data with appended parity bits to send the interleaved data and parity bits sequentially to the modulation/demodulation circuit 15 so that the data will be of a size equal to or approximately equal to an entire track of the optical disc.

The space used in each block on the buffer memory 12 is twice that of the optical disc of the above-mentioned digital video disc standard. That is, if a memory for ECC is provided independently of the buffer memory, the required space is twice that in the case of the format of the digital video disc.

The modulation/demodulation circuit 15 appends the frame sync or the like to data interleaved on the sector basis and modulates the resulting data in a predetermined modulation system to send the modulated data to a recording circuit of, for example, an optical pickup. This optical pickup records data on the optical disc.

With the present optical disc device 10, by setting the data size so as to correspond to the size of an entire track or to an approximate size thereto, data which can raise the data correction capability without increasing redundancy in data correction can be recorded on the optical disc.

The operation of various portions of the optical disc device in recording data on the optical disc by the optical disc device is hereinafter explained.

The modulation/demodulation circuit 15 is fed from the optical disc with reproduced signals of data recorded on the optical disc to a size equal to or approximately equal to the size of an entire track of the optical disc. The modulation/demodulation circuit 15 converts the reproduced signals into digital signals. The modulation/demodulation circuit 15 also generates synchronization signals and demodulates the signals to generate digital data. The modulation/demodulation circuit 15 sends the demodulated digital data and synchronization signals to the memory timing manager 11.

The memory timing manager 11 is connected via data bus and a control address bus to the buffer memory 12, correction circuit 13 and to the controller 4.

The memory timing manager 11 sequentially routes the digital data supplied thereto from the modulation/demodulation circuit 15 to the buffer memory 12 via data bus.

When a sufficient amount of data for error correction is stored in the buffer memory 12, the memory timing manager 11 sends the data to the correction circuit 13 as it deinterleaves the data from the buffer memory 12.

The correction circuit 13 corrects the deinterleaved data and parity bits for errors. The data corrected for errors is again stored in the buffer memory 12.

The space required per block on the buffer memory 12 is twice that in the case of the digital video disc. That is, if the memory for ECC is provided independently of the buffer memory 12, the required space is twice in the present embodiment that in the case of the digital video disc format.

The controller 14 sends data request signals to the memory timing manager 11. If a request signal is sent from the controller 14, the memory timing manager 11 sends error-corrected data from the buffer memory 12 to the controller 14. The memory timing manager 11 controls various parts of the optical disc device such as to reproduce data recorded to a size equal or approximately equal to an entire track of the optical disc.

The controller 14 sends the error-corrected data to an external connection device having a picture extension unit or a video signal outputting unit. This external connection device converts data reproduced from an optical disc reproducing device 10 into e.g., video data.

It is noted that a data volume V of the encoding block recorded on the optical disc, that is the ECC block, is the maximum number among data volume values of the encoding block that satisfies the relation $V \times (1+R) \times D < L0$, and that can be expressed by the powers of 2, where L0 is the innermost track length, R is the redundancy of encoding, and D is the code length per bit.

Also, the data volume of the encoding block is 64 kbytes or more, the length L1 per bit is 0.23 $\mu$m/bit or less and the encoding block is encoded by (1,7)RLL modulation. Meanwhile, 1 k in the data volume of 64 kbytes of the encoding block specified 1024.

It is noted that (1,7)RLL modulation means modulation by run-length limited code having the minimum run and the maximum run of the bit information (symbol) of 1 and 7, respectively, and a finite maximum length between transitions of the waveform string.

With the present optical disc device 20, data is read out and reproduced from an optical disc on which it has been recorded in terms of an ECC block, having a size extending or substantially extending an entire track of the optical disc, as a unit. This leads to improved error correction capability without increasing error correction redundancy.

The schematic structure of the optical disc device in its entirety is explained with reference to FIG. 4.

In the present optical disc device, a disc discriminator 150 discriminates the type of an optical disc 110 based on a recess provided in a cartridge used for holding and protecting an optical disc, and outputs an identification signal for the optical disc 110 to a system control circuit 134. Thus, the optical disc device 10 changes over the operation of the recording/reproducing system, depending on the type of the optical disc 10, in order to enable accessing to a variety of optical discs.

An encoder 151 is fed during recording and editing with an input signal SIN made up of video and audio signals from an external equipment and converts these video and audio signals into digital signals which are then compressed in accordance with a format prescribed in the Moving Picture Experts Group (MPEG). The encoder 151 packetizes the compressed video and audio signals and appends the header, control data and so forth to the resulting packets.

The encoder 151 sequentially outputs these packets to demultiplex the compressed video and audio signals to generate an encoding block DU by this demultiplexed bitstream. This encoding block corresponds to the above-mentioned ECC block.

During this series of operations, the encoder 151 simultaneously processes two channels at the maximum of the video and audio signals in parallel to output two channels of the encoding blocks DU1, DU2 associated with the two channels of the video and audio signals sequentially in parallel. By controlling the system control circuit 134, these two channels can be processed simultaneously in parallel.

Conversely to the encoder 151, the decoder 152 expands an encoding block DU, outputted during reproduction and editing, from the recording/reproducing circuit 153, in accordance with the format prescribed in MPEG, to generate digital video and digital audio signals. The decoder 152 converts these digital video and digital audio signals which are outputted as output signals SOUT.

Similarly to the encoder 151, the decoder 152 is adapted for simultaneously decoding video and audio signals SOUT1, SOUT2 of the maximum of two channels in parallel. The decoder 152 has its operation switched under control by the system control circuit 134 to execute simultaneous parallel processing of two channels, as the occasions may demand.

During recording and editing, the recording/reproducing circuit 153 stores encoding blocks DU outputted by the encoder 151 in the memory 154 and processes the stored DU in the memory 154 while processing the blocks DU in terms of a pre-set block as a unit for recording the processed blocks DU on the optical disc 110.

During reproduction, the recording/reproducing circuit 153 amplifies the playback signals RF and MO supplied from the optical head 111 and converts the amplified signals into bi-level signals. Also, using these bi-level signals as reference, clocks are reproduced from the playback signals RF and MO. In this manner, the reproduced clocks are in meeting with the write/readout clocks R/W CK. The bi-level signals are sequentially latched to detect playback data, using the reproduced clocks as reference.

At this time, the recording/reproducing circuit 153 decodes the reproduced data to generate decoded data. Also, the recording/reproducing circuit 153 deinterleaves the decoded data and corrects the deinterleaved data for errors to output the resulting data to the decoder 152.

If the optical disc is a magneto-optical disc, the recording/reproducing circuit 153 in the course of the sequence of reproducing operations selectively processes playback signals RF, having the signal level changed depending on the plane of polarization, under control by the system control circuit 134, in order to reproduce the encoding block DU. If the optical disc 110 is a magneto-optical disc, and its inner leading area is to be reproduced, the playback signals RF are selectively processed to process encoding blocks DU.

During recording, an address generating read-out circuit 155 generates address data to be appended to each sector data block, and outputs the generated address data to a recording/reproducing circuit 153. During reproduction, the address data detected by the recording/reproducing circuit 153 is analyzed and its contents are advised to the system control circuit 134.

The memory 154 is made up of a large-capacity buffer memory for transiently storing and holding the encoding blocks. Under address control by the write pointer and the readout pointer, the memory 154 has its recording area sequentially cyclically switched so that the encoding blocks DU are continuously exchanged with the encoder 151 and the decoder 152. Also, the memory 154 intermittently exchanges the encoding blocks DU between it and the optical disc 110 via the recording/reproducing circuit 153.

If, in a special operating mode, such as after-recording, two-channel encoding blocks DU1, DU2 are processed simultaneously in parallel, input/output pointers for the optical disc 110 and those for the encoder 151 and the decoder 152 are set in association with these two channels of the encoding blocks DU1, DU2. By address control by these pointers, the two channels of the encoding blocks DU1, DU2 are inputted to or outputted from the encoder 151 and the decoder 152 simultaneously in parallel and in succession, while the encoding blocks DU1, DU2 are alternately inputted to and outputted from the optical disc 110.

If the optical disc 110 is a magneto-optical disc, a laser driving circuit 157 drives the semiconductor laser of the optical head 111 at a timing synchronized with the write/readout clocks R/W CK, under control by the system control circuit 134, in order to raise the light volume of the light beam intermittently.

If the optical disc 110 is a phase-change write-once type disc, the laser driving circuit 157 intermittently raises the light volume of the light beam during writing, by output data of the recording/reproducing circuit 153, under control by the system control circuit 134, in order to record the encoding block DU in the optical disc 10.

During readout, the laser driving circuit 157 keeps the light volume of the light beam at a constant low level.

If the optical disc 110 is a magneto-optical disc, a modulation coil driving circuit 156 starts the recording operation, under control by the system control circuit 134, in order to drive the modulation coil of the optical head 111 by output data of the recording/reproducing circuit 153. Thus, the modulation coil driving circuit 156 applies a modulating magnetic field at a light beam illuminating position at which the light volume is increased intermittently. The technique of thermo-magnetic recording is applied for forming a mark in order to record data of the encoding block.

During recording, the system control circuit 134 converts the sequentially entered 1-channel video and audio signals SIN by the encoder 151 into the encoding blocks DU which are sequentially sent to the memory 154. By seeking the optical head 111 to a target sector to then keep a still state of the optical head, a data volume of a predetermined recording unit is stored in the memory 154. If the vacant capacity of the memory 154 is decreased to less than a predetermined value, the encoding block held by the memory 154 is recorded in the optical disc 110.

If, as a result of recording on the optical disc 110, the data volume of the encoding block held in the memory 154 falls to below a predetermined value, the system control circuit 134 interrupts the recording on the optical disc 110. The system control circuit 134 keeps the optical head 111 in a still state with respect to the next following sector and is in a standstill state until the data volume corresponding to the recording unit is again stored in the memory 154. If this data volume of the recording unit is stored in the memory 154, the system control circuit again permits the data to be recorded on the optical disc.

It is noted that a data volume V of the encoding block is the maximum number among data volume values of the encoding block that satisfies the relation VX(1+R) XD<L0, and that can be expressed by the powers of 2, where L0 is the innermost track length, R is the redundancy of encoding, and D is the code length per bit.

The system control circuit 134 sets the data volume of the encoding blocks and the length per bit D to not less than 64 kbytes and to not larger than 0.23 $\mu$m/bit, and encodes the encoding block by (1,7)RLL modulation.

Thus, the system control circuit 134 compresses the encoding blocks DU via memory 154 along time axis and records the encoding blocks intermittently so that consecutive encoding blocks will be allocated to consecutive sectors.

If the system control circuit 134 finds that, judging from the file management data recorded in the lead-in area of the optical disc 110, no continuous area can be procured on the optical disc, the system control circuit 134 discretely records the encoding blocks DU. In this case, when recording the encoding blocks DU on the optical disc, the system control circuit 134 performs control so that not only the still operations but also the seek operations are executed, while occasionally switching the rotational speed of the optical disc if so required.

If the user selects the reproducing operation, the system control circuit 134 causes the optical head 111 to seek the target sector. The system control circuit 134 then commands the reproduction to be started to store the decoded encoding blocks DU in the memory 154. The system control circuit 134 also causes the encoding bocks DU stored in the memory 154 to be sequentially outputted to the decoder 152.

If the data volume of the encoding blocks DU stored in the memory 154 is equal to a predetermined recording/reproducing unit and the vacant area in the memory 154 falls to below a predetermined value, the system control circuit 134 keeps the optical head 111 still for the next sector to discontinue generation of the encoding block DU from the optical disc.

If the data volume held in the memory 154 falls to below a predetermined value, the system control circuit 134 commands the start of reproduction of the optical disc 110. That is, the system control circuit 134 performs control to reproduce the encoding blocks DU intermittently by the optical disc 110 in order to output the output signal SOUT made up of the continuous video and audio signals without intermission.

It is seen from above that the present recording/reproducing apparatus records/reproduces the data on or from the optical disc in terms of the encoding blocks as units in accordance with a predetermined format.

The optical disc is explained in detail. This optical disc has a redundancy of error correction of the same order of magnitude as that of the digital video disc having the recording capacity of several Gbytes. The present optical disc is applicable to, for example, a read-onlyioptical disc, a write-once optical disc or to an overwrite optical disc.

In the case of the optical disc of the digital video disc standard, approximately 1.8 encoding blocks can be recorded in the innermost rim of the disc. The data volume of the encoding blocks in the digital video disc is 32 kbytes. Meanwhile, 1k in the data volume of 32 kbytes of the encoding block denotes 1024, with 32 kbytes denoting 32768 bytes.

In an optical disc of the digital video disc standard, there are 182×192=34944 bytes of data, inclusive of ID and the like data, prior to encoding, while the volume of data encoded in the ECC block is 192×208=39936 bytes.

An optical disc having its recording density improved to such an extent that not less than 2 such encoding blocks of the digital video disc can be recorded in the innermost nm of the disc is considered. The ECC block is desirably increased in size for improving the correction capability with respect to errors.

In general, the data size to be handled is desirably of the order of powers of 2 in view of management (addressing). In a general Galois field GF ($2^8$) used in the Reed Solomon product Code (RSPC), the lengths in the PI and PO directions can be set up to 255 symbols. That is, the product of the numbers of symbols in the PI and PO directions is 255×255=65025. However, this product is smaller than 64 kbytes. That is, since 1k=1024, the above product is smaller than 64k=65536 and, of course, cannot be made larger than 64 kbytes which is a data volume of the encoding block. Therefore, the ECC block size cannot be increased failing suitable measures.

Thus, an ECC block is constituted from two codes of the format of, for example, the digital video disc standard, and interleaved on the symbol basis. This cannot increase redundancy as compared to the format for the digital video disc.

The flow of symbols 21 on the disc, shown in FIG.5A, is such that even-numbered symbols are encoded in the first ECC block 22 as a first code conforming to the digital video disc standard, while odd-numbered symbols are encoded in the second ECC block 23 as a second code conforming to the digital video disc standard, as shown in FIG. 5B.

Each of the first ECC block 22 of the first code and the second ECC block 23 of the second code has the data volume of the encoding block of 32 kbytes and a code length of 39936 bytes. Therefore, the ECC block in this case has a block size twice that of the encoding block of the above-mentioned first and second ECC blocks, such that the capacity of the encoding block is 64 kbytes and the block size is 79872 bytes.

Also, an ECC block is constituted by two codes of the digital video disc standard format and interleaved from one encoding line to another, as shown in FIG.6. This does not increase redundancy as compared to the format of the digital video disc standard.

The flow of symbols 25 on the disc, shown in FIG.6A, is such that even-numbered symbols are encoded in a first ECC block 26 as a first code conforming to the digital video disc standard, while odd-numbered symbols are encoded in a second ECC block 27 as a second code conforming to the digital video disc standard.

Each of the first ECC block 26 of the first code and the second ECC block 27 of the second code has the data volume of the encoding block of 32 kbytes and a code length of 39936 bytes. Therefore, the ECC block in this case has a block size twice that of the encoding block of the above-mentioned first and second ECC blocks, such that the capacity of the encoding block is 64 kbytes and the block size is 79872 bytes.

There is also block encoding in which, in distinction from the product coding PRC, codes are formed only in one direction and interleaving is applied between the codes. FIG.4 shows an ECC block produced by this block coding.

In this case, the data volume unit of the encoding block again is desirably powers of 2 for management purposes, such as addressing. In this figure, similarly to FIG. 5, the data volume unit is assumed to be 64 kbytes. The ECC block has a code length of 240 symbols, with the interleaving factor being 320. That is, the code length of 240 symbols of the ECC block is made up of 208 symbols of data and 32 symbols of parity.

Of the 208×320=66560 bytes, 64 kbytes are used for the encoding block. The portion of the ECC block other than that used for the encoding block is used for e.g., control data.

Figure 8:
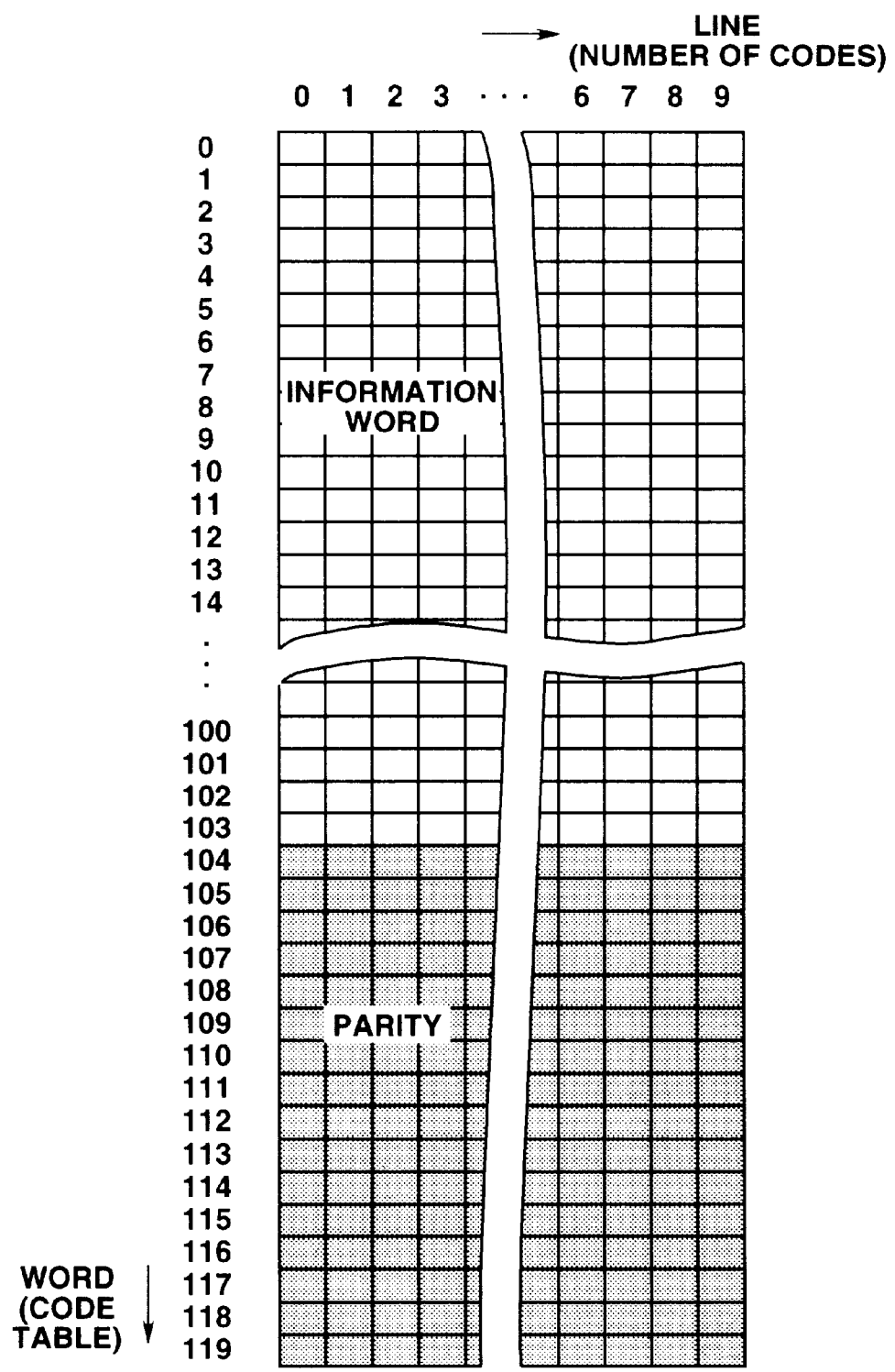
FIG. 8 shows an ISO MO format.

For reference sake, the logical format of the ISO MO standard for the magneto-optical disc is shown in FIG. 8. The ECC block of the ISO MO standard has a code length of 120 symbols made up of 104 symbols of data and 16 symbols of parity. The interleaving factor of the MO standard is 10, with the data volume of the encoding block being 1 kbyte.

Figure 7:
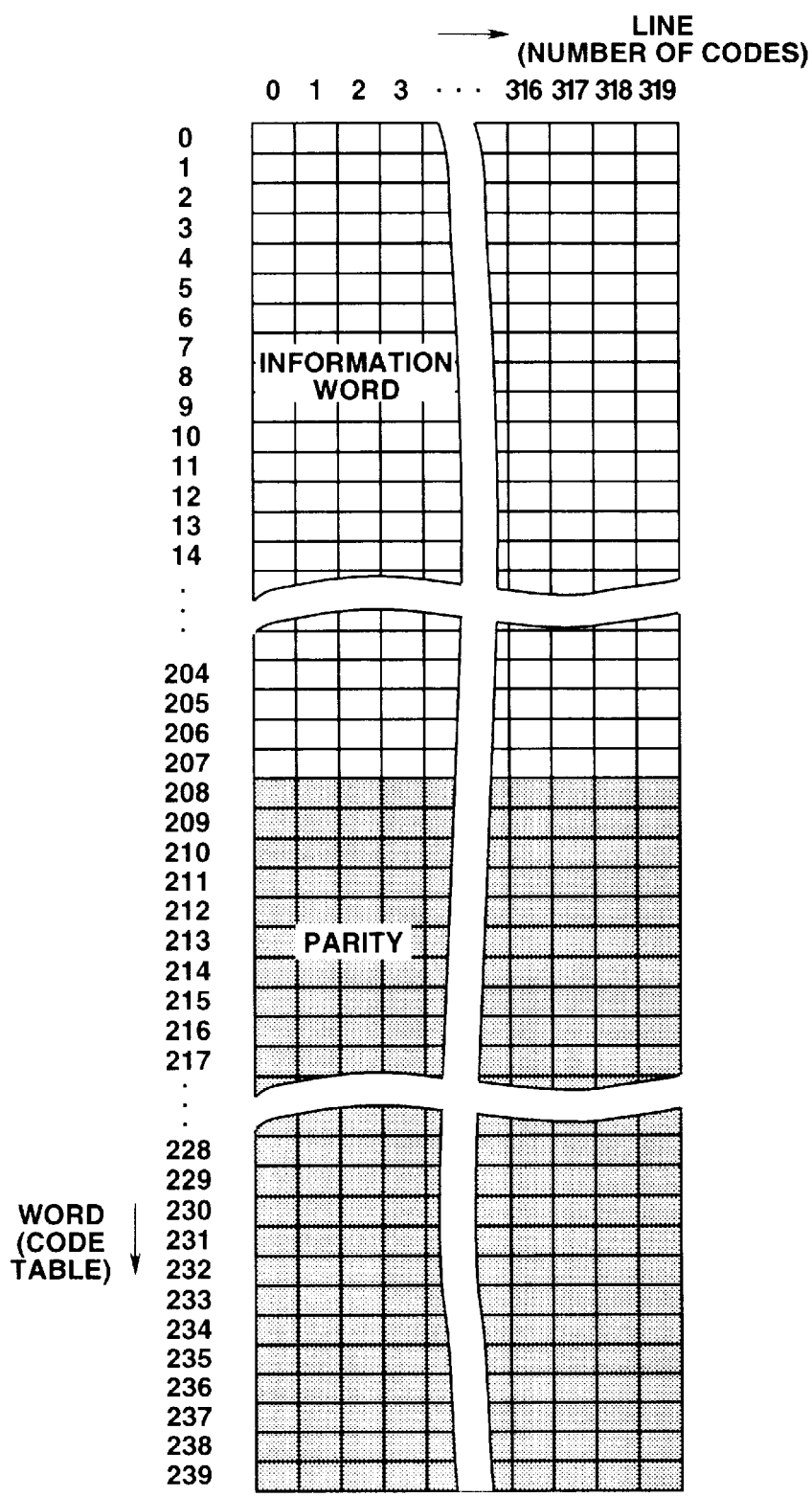
FIG. 7 shows an ECC block obtained on encoding by constructing the code only in one direction.

Referring to FIG. 7, showing the format of the ECC block, the code length of the ECC block of the MO logical format shown in FIG. 8 is doubled, while the data volume of the encoding block is 64 kbytes, such that the ECC block extends substantially one track lap length. The format is similar in redundancy to the MO format.

In any of the logical format diagrams, physical redundancy signals or data such as VFO or resync are omitted from the drawing. It is noted that VFO is a continuous repetitive data pattern for enabling positive data reproduction despite fluctuations in disc rotation, while resync means a special code pattern used for detecting a data readout start position (synchronizing position).

Physical recording and/or reproduction on or from the disc is on the sector basis whilst encoding and decoding is on the block basis. Thus, for recording and/or reproduction, the block has significance as a logical unit. Therefore, there in no necessity of being conscious about the sector in executing the sequence of recording or reproduction for the ECC block.

In one of the RAM disc systems, the address information specifying the physical position during recording/reproduction is provided as pre-pits. There is also required physical redundancy such as automatic power control APC required for recording.

The unit of preformatting the address information or the sector of introducing or providing physical redundancy may be thought of as a sector. The sector can be utilized during recording/reproduction as the physically accessed information, while it need not be taken into account as a recording/reproducing unit of logical encoding blocks.

In an addressing method employing wobbling, there is no necessity of introducing the address information by pits. In the case of a system in which the APC information can be appended on the ECC block basis, there is no necessity of providing a sector. Therefore, the block can be handled in the same manner as sectors.

In the case of a system employing sampled servo and in which a servo area and a data area are separated from each other and the address or the APC area have no pertinence to data, there is again no necessity of providing a sector. Here again, the block can be handled similarly to the sector.

In the case of a digital video disc, as a ROM disc, in which the address information is appended to the encoding block to constitute a pre-encoding data, there is no necessity of taking the sector into account.

The ECC block size is desirably not larger than one track length because radially extended scratches or flaws tend to be taken as being a specified code. In particular, in zoned discs, the effect of the scratches or flaws occasionally differs from zone to zone to complicate the corresponding processing.

The ECC block size is based on the innermost rim of the disc. Since the track lap length is shortest on the innermost area of the disc, the ECC block size, based on the innermost track as a reference, can be unobjectionably applied to other tracks.

It is noted that, if there is used an optical disc having encoding blocks of a predetermined data volume encoded as an encoding unit and recorded thereon, a data volume V of the encoding block is the maximum number among data volume values of the encoding block that satisfies the relation VX(1+R)XD<L0, and that can be expressed by the powers of 2, where L0 is the innermost track length, R is the redundancy of encoding, and D is the code length per bit. In the case of a so-called zone disc in which each track is divided into plural areas along the radius of the recording surface of the disc, the ECC block size can be set from zone to zone. If the encoding block capacity is a power of 2, there is presumably only little room for selection because the capacity is increased by powers of 2.

In the optical disc of the present invention, the interleaving factor is preferably set so as to be comprised in one track lap length. The reason is that, if sectors present in one block are distributed in plural track lap lengths, an error produced in one block is increased on occurrence of disc defect or dust deposition across plural track lap lengths, such that there is a risk of the errors produced in one block exceeding the correctable rows.

Therefore, the interleaving factor is preferably the number of blocks comprised in the innermost track. The reason is that, if the number of the blocks comprised in the innermost track is the interleaving factor, one-block sectors are necessarily accommodated in one track lap.

On the other hand, in a digital video disc, the number of blocks in the innermost track is 1.86 blocks. Therefore, in the optical disc of the present invention in which the recording density is double that of the digital video disc in the tangential direction, the number of blocks comprised in the innermost track is 3.72 blocks. It is seen from this that the interleaving factor is set to 3 blocks.

In the above optical disc and an optical disc device for recording and/or reproducing data using the above optical disc, a light beam having a wavelength $\lambda$ not larger than 680 nm is illuminated on the optical disc by an optical system having a working distance of 560 $\mu$m and the numerical aperture NA of not larger than 0.7 to record data of a desired encoding block. Also, data is recorded by (1,7) RLL modulation or shortest mark length of not larger than 0.3 $\mu$m to a bit length not larger than 0.23 $\mu$m/bit. In addition, the track pitch is set to not larger than 0.6 $\mu$m and the data transfer rate is set to not less than 11.08 Mbps.

In the above optical disc and the optical disc device for recording and/or reproducing data for the optical disc, redundant data with the ratio of redundancy of not larger than 23% is appended to the data of the encoding block, and the thickness of the light transmitting layer is set to 10 to 177 µm, while the numerical aperture NA and the wavelength are set so that fluctuations Δt of the thickness of the light transmitting layer satisfies the relation:

$$\Delta t \leq \pm 5.26 \times (\lambda/NA^4)[\mu m].$$

The correction capability can be improved by increasing the code size, as discussed above. That is, an encoding block made up of plural symbols and in which interleaving is applied across these symbols, this block can be thought of as a symbol in the broad sense of the term. Therefore, the correction capability can be improved by increasing this block in size.

That is, the error correction capability can be improved by setting the block size to a size extending or substantially extending along the entire track. If the recording/reproducing processing unit can become a block size, interleaving can be applied on the symbol basis without taking the sector into account.

Figure 9:
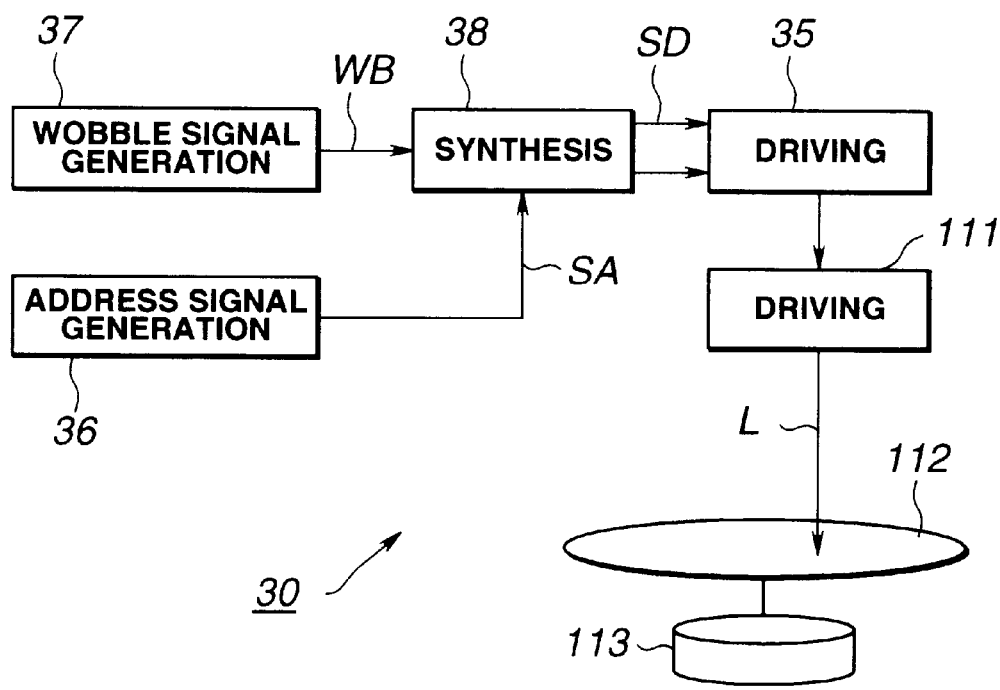
FIG. 9 is a block diagram showing the structure of a mastering device used for producing a master of the optical disc.
Figure 10:
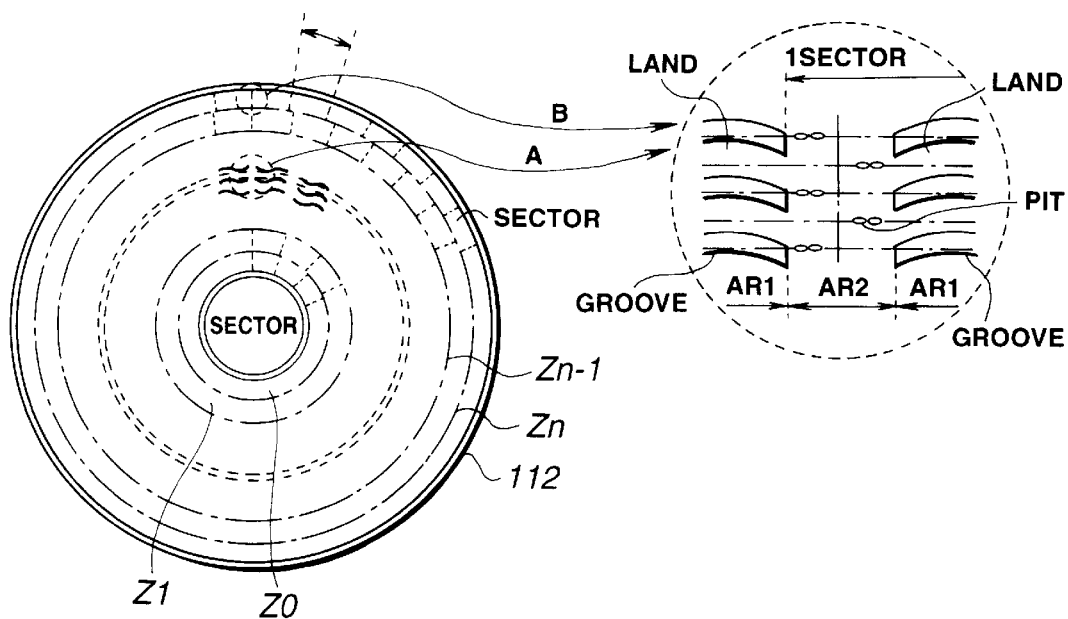
FIG. 10 shows a master disc obtained on zoning by the mastering device.

Referring to FIG. 9, a specified example of a mastering device for producing a master disc of an optical disc having pit strings and wobbles, as an example of the above-mentioned recordable optical disc, is hereinafter explained.

In the manufacturing process of an optical disc of the present embodiment, a master disc 112 is exposed to light by this mastering device 30, and an optical disc is formed from this master disc 112.

In this mastering device, the master disc 112 is prepared by coating the surface of a glass substrate with a resist. The master disc 112 is run in rotation by a spindle motor 113 at a constant angular velocity.

The optical head is sequentially moved by a predetermined thread mechanism in synchronism with the rotation of the master disc 112, from the inner rim towards the outer rim of the master disc 112, to illuminate a light beam L on the master dis 112. This allows the optical head to form a track spirally from the inner rim towards the outer rim of the master disc 112.

For preparing the optical disc from the master disc 112 by the optical head, the spot diameter of the light beam L is set so that a groove formed on light exposure with the light beam L will be of a width equal to that of a land defined between the groove and the adjacent groove.

It is noted that the spot shape and the light volume of the light beam L is set so that the effective light exposure volume by the light beam L will be increased relative to the width of the groove as an ultimate target. This allows the optical head to expose the disc substrate 112 to light to permit recording between lands and grooves.

The optical head is adapted for being moved radially of the master disc 112.

The driving circuit 111 drives the optical head responsive to a driving signal SD. At this time, the driving circuit 111 changes over the driving timing of the optical head depending on the light beam illuminating position by the timing synchronized with the rotation of the disc substrate 112 to effect zoning of the disc substrate 112. In the drawing, the groove and the pit are drawn only schematically.

The driving circuit 135 splits the information recording surface into plural radial zones to form a sector structure by changing over the optical head driving conditions. By changing the changeover timing from the inner rim towards the outer rim stepwise, the information recording surface is split into plural concentric circles to form plural zones Z0 to Zn.

Each sector has its leading end and the remaining portion allocated to an address area AR2 and a user area, as shown by arrows A and B indicating the sector area to an enlarged scale.

The driving circuit 35 moves the light beam illuminating position by a driving signal SD under control by a system driving circuit, not shown, to form a wobble corresponding to a meandering groove in the user area AR1.

In the address area AR2, movement of the light beam illuminating position is discontinued at the former half portion of the address area AR2 and the light volume of the light beam is intermittently initiated by the driving signal SD to form a pit string at the track center formed by a groove. Also, in the latter half portion of the address area AR2, the light beam illuminating position is shifted to the track center by the land on the inner rim side to raise the light volume of the light beam intermittently by the driving signal SD to from a pit string on the track center by the lands.

This address area AR2 forms the address information, specifying the physical position required during recording/reproduction, in the forms of pre-pits.

That is, the driving circuit 35 is configured for recording a pit string on the track center corresponding to address data of a sector by the next following groove, in the former half of the address area AR2, and for recording a pit string on the track center corresponding to address data of a sector by the next following radially inner side land in the latter half of the address area AR2.

A wobble signal generating circuit 37 outputs a sine wave of a defined frequency synchronized with rotation of a disc substrate as a wobble signal WB. At this time, the wobble signal generating circuit 37 increases the frequency of a wobble signals WB stepwise to output the resulting wobble signal. This allows the wobble signal generating circuit 37 to shift the light beam illuminating position by the wobble signals WB to meander the groove at a defined period per sector. The address information is recorded by this wobbling.

That is, in the address area (header area) AR2, a length corresponding to a constant period of the groove is allocated and, in a track of the innermost zone Z0, the groove is formed to meander at a defined period, with the groove meander progressively increasing towards the outer side zone.

An address signal generating circuit 36 generates an address signal SA, whose value is progressively changed with the movement of the optical head under control by the system control circuit. That is, the address signal generating circuit 36 is fed by a spindle motor 113 with a timing signal synchronized with the rotation of the disc substrate 112, such as FG signal, and counts the number of the timing signals by a counter. This allows the address signal generating circuit 36 to generate address data ID of the light beam illuminating position.

The address signal generating circuit 36 appends a sector mark, timing data for synchronization VFO, address marks AM and the postamble PA to the address data ID to form sector headers which are allocated to the former and latter halves of the address area AR2.

An address mark AM is an synchronization signal for addresses. The address data ID has the same data recorded twice to improve its reliability correspondingly. The postamble is appended for setting signal polarity.

The address signal generating circuit 36 converts the sector headers thus formed into a serial data string which is then modulated in accordance with a defined format. Also, the address signal generating circuit 36 outputs the modulated signal as an address signal SA. The address signal generating circuit 36 outputs the address signal SA at a timing corresponding to the actuation of the light beam L.

A synthesis circuit 38 synthesizes the wobble signal WB and the address signal SA together to generate a driving signal SD comprised of a movement signal for moving the optical system of the optical head and a light volume control signal for controlling the light beam to output the driving signal SD to the driving circuit 35.

The optical disc produced from this disc substrate has its information recording surface split into plural concentric circles and is preformatted so that the number of sectors will be increased in general from the inner rim side towards the outer rim side. At the leading end of each sector is formed an address area AR2. In this address area AR2 are recorded an address of the next following sector by the groove and the address of the next following sector by the land. In the next following user area AR1 is recorded desired data.

It is noted that the master disc 112 is provided with a gap and a guard. The gap is a land/groove changeover area and a laser light volume changeover area. The guard is arranged for suppressing fluidity of a recording material by overwriting and for improving the overwrite cycle of the recording area in case of using a phase-change medium as a recording medium.

The above-mentioned optical disc is manufactured from a master disc prepared by the above-described mastering device.

What is claimed is:

1. An optical disc on which is recorded data encoded using an encoding block of a pre-set data volume as an unit for encoding, characterized in that a data volume V of the encoding block is the maximum number among data volume values of the encoding block that satisfies the relation $V(1+R)D<L0$, and is expressible by a power of 2, where L0 is the innermost track length, R is the redundancy of encoding, and D is the code length per bit.

2. The optical disc according to claim 1 wherein the data volume of said encoding block is not less than 64 kbytes.

3. The optical disc according to claim 2 wherein said encoding block is constructed from an error correction code interleaved in the direction of data on the disc so that an interleaving depth is longer than a code length useable by the correction code.

4. The optical disc according to claim 2 wherein said encoding block is constructed from plural product codes and is interleaved using a symbol constituting each product code as an unit.

5. The optical disc according to claim 2 wherein said encoding block is constructed from plural product codes and is interleaved using a code constituting each product code as an unit.

6. The optical disc according to claim 1 wherein a length D per bit is not larger than 0.23 $\mu$m/bit.

7. The optical disc according to claim 1 wherein said encoding block is encoded by (1,7)RLL modulation.

8. The optical disc according to claim 1 wherein the innermost track length L0 is 0.1508 m, redundancy of encoding R is 23% and the code length per bit D is 0.23 $\mu$m, with the data volume capacity of the encoding block being 64 kbytes.

9. An optical disc apparatus for recording and/or reproducing information signals on or from an optical disc characterized in that an optical disc is used on which is recorded data encoded using an encoding block of a pre-set data volume as an unit for encoding, and in that a data volume V of the encoding block is the maximum number among data volume values of the encoding block that satisfies the relation $V(1+R)D<L0$, and is expressible by a power of 2, where L0 is the innermost track length, R is the redundancy of encoding, and D is the code length per bit.

10. The optical disc apparatus according to claim 9 wherein, in the encoding or decoding step, the encoding block is an error correction code interleaved in the data direction on the disc, with the interleaving depth being larger than the code length usable by the correction code.

11. The optical disc according to claim 9 wherein, in the encoding or decoding step, said encoding block is constructed from plural product codes and is interleaved using a symbol constituting each product code as an unit.

12. The optical disc according to claim 9 wherein, in the encoding or decoding step, said encoding block is constructed from plural product codes and is interleaved using a code constituting each product code as an unit.

* * * * *